United States Patent
Circello et al.

(10) Patent No.: US 9,489,316 B2
(45) Date of Patent: Nov. 8, 2016

(54) METHOD AND DEVICE IMPLEMENTING EXECUTE-ONLY MEMORY PROTECTION

(71) Applicants: Joseph C. Circello, Phoenix, AZ (US); Daniel M. McCarthy, Phoenix, AZ (US); David J. Schimke, Phoenix, AZ (US)

(72) Inventors: Joseph C. Circello, Phoenix, AZ (US); Daniel M. McCarthy, Phoenix, AZ (US); David J. Schimke, Phoenix, AZ (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 264 days.

(21) Appl. No.: 13/842,006

(22) Filed: Mar. 15, 2013

(65) Prior Publication Data
US 2014/0281137 A1    Sep. 18, 2014

(51) Int. Cl.
| | | |
|---|---|---|
| G06F 12/14 | (2006.01) | |
| G06F 9/30 | (2006.01) | |
| G06F 9/32 | (2006.01) | |
| G06F 9/38 | (2006.01) | |

(52) U.S. Cl.
CPC ....... G06F 12/1425 (2013.01); G06F 9/30181 (2013.01); G06F 9/324 (2013.01); G06F 9/3814 (2013.01); G06F 9/3824 (2013.01); G06F 9/3861 (2013.01); G06F 2212/202 (2013.01)

(58) Field of Classification Search
CPC ............... G06F 21/79; G06F 12/1441; G06F 9/30043; G06F 9/383
USPC ................................................... 711/103, 163
See application file for complete search history.

(56) References Cited

U.S. PATENT DOCUMENTS

| | | | | |
|---|---|---|---|---|
| 5,091,845 A | * | 2/1992 | Rubinfeld | G06F 9/3877 711/118 |
| 5,095,424 A | * | 3/1992 | Woffinden | G06F 12/0848 711/123 |

(Continued)

FOREIGN PATENT DOCUMENTS

| | | | |
|---|---|---|---|
| EP | 1429246 A1 | * | 6/2004 |
| WO | WO 2005116842 A1 | * | 12/2005 |

OTHER PUBLICATIONS

Yaun Liu, Architecture design of variable lengths instructions expansion for VLIW, Oct. 20, 2009, IEEE, The IEEE 8th International Conference on ASIC. ASICON'09. p. 29-32.*

(Continued)

*Primary Examiner* — Jared Rutz
*Assistant Examiner* — Khoa D Doan

(57) ABSTRACT

Access requests to access data operands from memory space designated as a type of execute-only memory are allowed to precede in response to determining that the operand access request was generated using a particular type of addressing mode.

16 Claims, 7 Drawing Sheets

(56) References Cited

U.S. PATENT DOCUMENTS

| | | | | |
|---|---|---|---|---|
| 5,119,484 A * | 6/1992 | Fox | G06F 9/267 | 712/212 |
| 5,226,170 A * | 7/1993 | Rubinfeld | G06F 9/3877 | 712/34 |
| 5,276,892 A * | 1/1994 | Olesin | G06F 9/226 | 712/245 |
| 5,829,029 A * | 10/1998 | Shelly | G06F 12/0859 | 711/130 |
| 5,911,151 A * | 6/1999 | Circello | G06F 9/325 | 709/200 |
| 6,282,657 B1 * | 8/2001 | Kaplan | G06F 8/60 | 711/E12.097 |
| 6,470,238 B1 * | 10/2002 | Nizar | G06F 13/1668 | 700/153 |
| 6,934,817 B2 * | 8/2005 | Ellison | G06F 12/1491 | 711/152 |
| 7,834,881 B2 * | 11/2010 | Liu | G06F 9/3012 | 345/505 |
| 7,895,404 B2 | 2/2011 | Batifoulier et al. | | |
| 8,352,670 B2 * | 1/2013 | Serebrin | G06F 9/455 | 711/163 |
| 2003/0060934 A1 * | 3/2003 | Walsh | G11C 7/1045 | 700/299 |
| 2005/0024954 A1 * | 2/2005 | Dalvi | G06F 12/1433 | 365/199 |
| 2005/0201195 A1 * | 9/2005 | Dirscherl | G06F 9/30054 | 365/189.08 |
| 2006/0174089 A1 * | 8/2006 | Altman | G06F 9/30072 | 712/24 |
| 2008/0040563 A1 * | 2/2008 | Brittain | G06F 1/3225 | 711/154 |
| 2009/0113155 A1 * | 4/2009 | Beals | G06F 12/1466 | 711/164 |
| 2011/0107037 A1 * | 5/2011 | Yoshida | G06F 11/3037 | 711/154 |
| 2011/0138141 A1 * | 6/2011 | Batifoulier | G06F 12/1441 | 711/163 |
| 2011/0202739 A1 * | 8/2011 | Grisenthwaite | G06F 12/1491 | 711/163 |
| 2012/0042145 A1 * | 2/2012 | Sehr | G06F 12/1491 | 711/163 |
| 2012/0198177 A1 * | 8/2012 | Moyer | G06F 12/1441 | 711/140 |
| 2013/0304979 A1 * | 11/2013 | Zimmer | G06F 13/14 | 711/103 |

OTHER PUBLICATIONS

Schaum's Outline of Theory and Problems of Computer Architecture. McGraw-Hill Companies Inc. Indian Special Edition 2009.*
Larry Snyder, University of Washington, 2000.*

* cited by examiner

METHOD AND DEVICE IMPLEMENTING EXECUTE-ONLY MEMORY PROTECTION

BACKGROUND

Field of the Disclosure

The present disclosure relates generally to data processing devices and methods and more particularly to data processing using a type of execute-only memory space.

Description of the Related Art

A particular trend with embedded microcontrollers is the increasing need to prevent information stored in memory, such as program code, from being copied by unauthorized sources. One type of memory protection uses the concept of execute-only memory to protect code images from unauthorized accesses by allowing instruction access requests to memory space that is designated as execute-only memory (XOM), while preventing operand access requests, also referred to as data access requests to XOM.

XOM is readily implemented with data processor architectures that support instructions of sufficient length, such as data processors having an Instruction Set Architecture (ISA) that supports variable-length instructions. The use of XOM with other data processor architectures, such as data processors having an ISA with small fixed-length instructions, can be more difficult to implement. The additional complexity of implementing XOM with data processors that support fixed-length instructions is apparent by comparing the manner in which fixed and variable-length ISA's can add a constant value to a register location.

For example, a data processor that supports variable-length instructions can access an instruction from XOM that includes an opcode, and an operand of variable size, e.g., 8-bits, 16-bits, or 32-bits, where the operand is a constant value that is referred to as an immediate operand by virtue of being part of the instruction itself. Thus, a 32-bit data processor that supports variable-length instructions can execute an ADD instruction having a length that is sufficient to accommodate an opcode identifying the instruction, register identifiers indicating source/destination locations of operands/resultants, and a 32-bit immediate operand that is a constant to be added to the source/destination. For purposes of discussion, it is presumed that such an ADD instruction is a 48-bit instruction that includes a 32-bit immediate value, e.g., a constant, that is to be added to a designated register location of the 16-bit operation code (opcode) that defines the ADD operation including register identifiers.

In comparison, a data processor having fixed-length 32-bit instructions, or smaller, cannot access an instruction from XOM that includes both an opcode and a 32-bit immediate operand. Instead, a fixed-length instruction, e.g. an ADD instruction performing the same function as the ADD instruction described above, needs to fetch the 32-bit operand using a separate data fetch from that used to retrieve the instruction itself.

For example, instead of including an immediate operand, a 32-bit add instruction can include an index field having a value that is added to the program counter to indicate where a 32-bit addend, e.g., a constant, is stored in memory. Determining the address of an operand in this manner is referred to as program counter-relative (PC-relative) addressing. Thus, a fixed length 32-bit instruction can include an opcode of an ADD instruction that uses PC-relative addressing, a register indicator identifying a source/destination location of an operand/resultant, and an index, presumed to be eight-bits, that is added to the program counter of the instruction to identify a target address at which a 32-bit constant value is stored that will be added to the destination location identified by the register indicator. Thus, while a fixed-length instruction ISA can include an ADD instruction that results in a 32-bit constant being added to a destination register, the 32-bit constant is not accessed by the same instruction fetch mechanism that retrieved the ADD instruction, but instead is accessed by a separate operand fetch from a location of memory that is within a maximum offset range of the program counter of the instruction.

It will be appreciated that in order to use XOM to protect fixed-length instructions that use PC-relative addressing, it is necessary to partition the memory space to have at least one non-execute-only memory (nXOM) location within 256 words of the XOM location where the PC-relative instruction is stored, wherein the range of the index to be added to the PC of instruction is 256. Supporting small amounts of nXOM for read only data storage near instruction code stored in XOM space results in the need to partition XOM and nXOM using a relatively fine granularity, as opposed to the XOM/nXOM granularity needed when using variable-length instructions that store and access the constant values as immediate operands that are part of the instructions themselves. Implementing systems that need finely partitioned XOM/nXOM space are more costly than systems that use coarsely partitioned XOM/nXOM space. Alternatively, fixed-length instruction systems can avoid the use of PC-relative commands; however, this can result in operand requests to distant memory locations that require additional resources and time to access the distant locations.

BRIEF DESCRIPTION OF THE DRAWINGS

The present disclosure may be better understood, and its numerous features and advantages made apparent to those skilled in the art by referencing the accompanying drawings.

DETAILED DESCRIPTION

In accordance with a particular embodiment of the present disclosure, a memory is partitioned into a type of execute-only memory that can store instructions and operands that are typically constants, referred to as an execute-only and constants memory (XOCM), and non-execute-only and constants memory (nXOCM). Read requests to nXOCM are not qualified based upon whether a request is an instruction or operand request. Read requests to XOCM, however, are qualified based upon whether a request is an instruction or operand request, where, for example, according to one embodiment, access requests to retrieve an operand from XOCM are allowed to proceed in response to determining that the operand request was generated using a particular addressing mode, such as PC-relative addressing. Various manners in which it can be determined whether or not the particular addressing mode is used will be better understood with reference to the various embodiments of the present disclosure described at FIGS. 1-9.

The term "access request" as used herein is intended to refer to any memory access request, regardless of its specific attributes. For example, an access request can be a read access request (a read request) or a write access request (write request). An access request generated by a data processor operating in a supervisor mode is referred to herein as a "supervisor access request", a "supervisor request", or a "supervisor mode request". An access request generated by a data processor operating in a user mode, as opposed to supervisor mode, is referred to herein as a "user access request", a "user request", or a "user mode request". It will be appreciated that a processor operating in supervisor mode is associated with a higher level of trust than when operating in user mode. The terms "instruction access request" and "instruction request" as used herein are intended to refer to a read request that is identified as fetching an instruction. The terms "operand access request" and "operand request" as used herein are intended to refer to a read request that is identified as fetching information that is not identified as fetching an instruction, such as operands being requested on behalf of an instruction being executed. The terms "XOCM access request" and "XOCM request" as used herein are intended to refer to an access request having a target address that resides in memory space identified as XOCM space. The terms "nXOCM access request" and "nXOCM request" as used herein are intended to refer to an access request having a target address that resides in memory space identified as nXOCM space. It will be appreciated, that a particular access request can have multiple attributes. For example, a "user instruction request" refers to an access request that is both a user request and an instruction request. A "user mode XOCM operand read request" refers to an access request that is a user request, an operand request, a XOCM request, and a read request.

Figure 1:
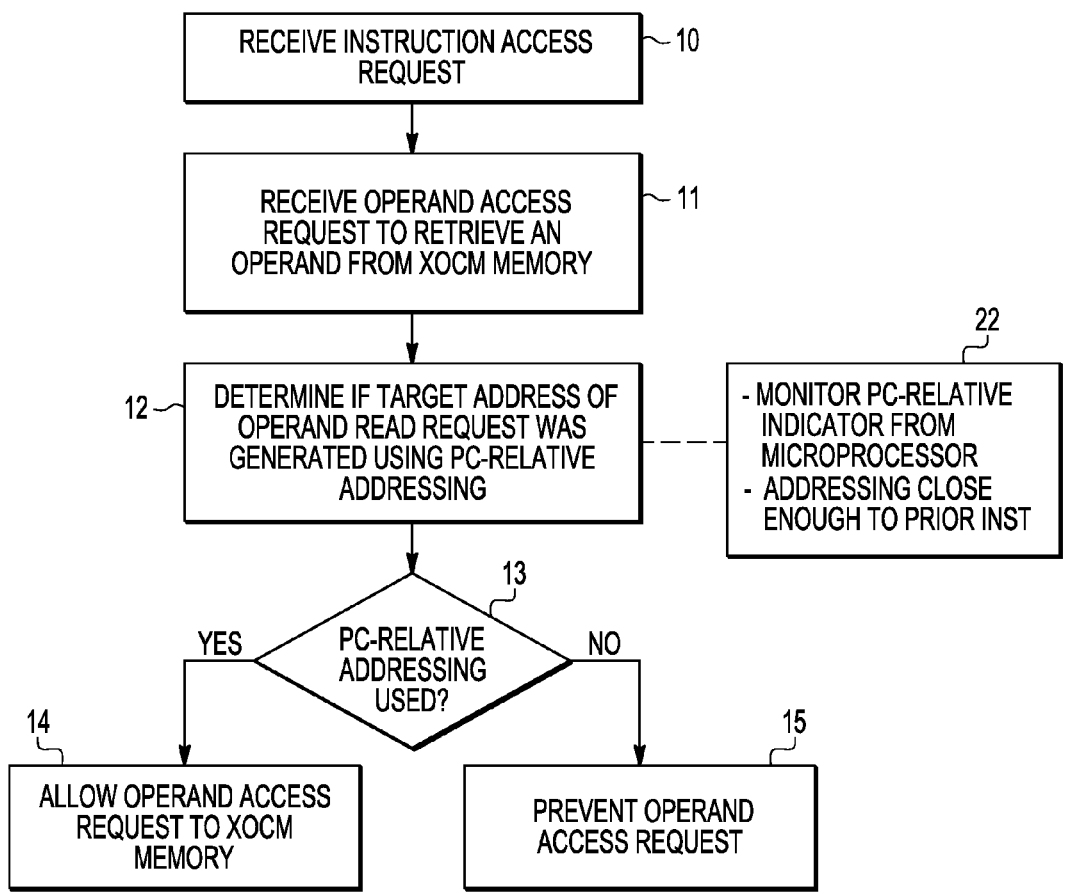
FIG. 1 illustrates a method in accordance with particular embodiments of the present disclosure.

FIG. 1 illustrates in flow diagram form a particular embodiment of selectively allowing an operand access from XOCM. At block 10, a user instruction request has been received that requests an instruction at a target address be read from the target location. The instruction request can be retrieved from either XOCM or nXOCM space. At block 11, a user operand read request having a target address that resides in XOCM space has been received. At block 12, it is determined if the target address was generated using a particular type of addressing mode, presumed to be PC-relative addressing. Side block 22 identifies various embodiments for determining if PC-relative addressing was used. For example, an indicator can be sent as part of the access request that indicates whether or not the operand request was generated using PC-relative addressing, wherein the indicator has one value (PCRA) that indicates the destination address was generated using PC-relative addressing, and different value (nPCRA) that indicates the destination address was not generated using PC-relative addressing. Also identified at side block 22, is an alternate embodiment that determines whether PC-relative addressing was used to generate the target address of the operand request based upon a comparison of the target address of the operand request to the target address of a previously fetched instruction, such as the instruction request of block 10. The destination address of the operand request can be determined to have been calculated using PC-relative addressing in response to the target address of the operand request being sufficiently close to the target address of a previously fetched instruction, as discussed in greater detail below.

At block 13, it is determined based upon the evaluation performed at block 12, whether or not PC-relative addressing was used to generate the target address of the operand request. If so, flow proceeds to block 14, where the user mode operand read request is allowed to proceed, and presumed to access XOCM, otherwise, flow proceeds to block where the operand request is prevented from returning the requested data to the requesting source. Selectively allowing user mode operand read requests to XOCM in the manner illustrated at FIG. 1 allows for an implementation of memory protection that based upon the concepts of execute-only memory protection techniques, but that does not require fine partitioning of memory space when using data processors that execute fixed-length instructions using PC-relative addressing or have other limitations for embedding literals in the instruction stream, that is, the code image.

FIGS. 2-6 illustrate a data processing system that monitors a PC-relative addressing indicator generated by the data processor to selectively allow user operand requests to XOCM. At FIG. 2, a data processing system device 10 is illustrated having an integrated circuit 11, a global memory 92, and an interconnect 91. The interconnect 91 is connected to the integrated circuit 11 and to the global memory 92. During operation, access requests generated at the integrated circuit 11 can be communicated to global memory 92, or to other external devices (not shown), via interconnect 91 to load and store information.

Integrated circuit 11 can be an integrated circuit die, a packaged device that can include one or more integrated circuit die, a printed circuit board that can include one or more packaged devices and integrated circuit die, the like, and combinations thereof. For purposes of discussion, integrated circuit 11 is implemented as an integrated circuit die that includes a plurality of devices including data processor core 21, a memory 22, a peripheral 25, a peripheral 26, a Bus Interface Unit (BIU) 27, an interconnect 16 connected to the devices of integrated circuit 11, and other devices not shown such as additional data processor cores.

Data processor core 21 is illustrated to include a pipeline unit 42 that executes instructions, an instruction fetch unit (IF) 43 that fetches instructions for consumption by the pipeline unit 42, a data operand fetch unit (DOF) 44 that fetches data and operands for consumption by pipeline unit 42, a storage location 41 where a program counter (PC) is stored that indicates the address of a current instruction, e.g., an instruction being executed by the pipeline unit 42, and a bus interface unit (BIU) 45 that provides a communication interface between various portions of the data processor core 21 and the interconnect 16. It will be appreciated that only those interconnects between the features of data processor 21 that are referred to herein are specifically illustrated at FIG. 2, such as interconnect 46 that is connected between the pipeline unit 42 and the data operand fetch unit 44.

During operation, the pipeline unit 42 generates program flow information that is used by instruction fetch unit 43 to request instructions for consumption by the pipeline unit 42. Pipeline unit 42 also generates information that is used by data operand fetch unit 44 to request operands needed by pipeline unit 42. The information from the pipeline unit 42 that is used by the data operand fetch unit 44 includes a target address and an indicator, via interconnect 46, that indicates whether the target address of an operand being requested was generated by the pipeline unit 42 using PC-relative addressing. In particular, an indicator PCRA, presumed to be a logic one, is communicated via interconnect 46 when PC-relative addressing was used to generate the target address, and an indicator nPCRA, presumed to be a logic zero, is communicated via interconnect 46 when PC-relative addressing was not used to generate the target address. Data operand fetch unit 44 generates one or more access requests to fetch requested operands for consumption by the pipeline unit 42.

Instruction fetch unit 43 and operand data fetch unit 44 can generate access requests having target addresses that reside at one of several available memory devices, which may or may not be local to data processor 21. Addresses local to data processor core 21 can be for various resources, such as a cache (not shown) or a register set (not shown). Addresses for resources external to data processor core 21 are provided to interconnect 16, via BIU 45, and can request information, e.g., instructions and data operands, from one or more memory mapped resources, such as flash memory 22 or global memory 92, or locations of other resources, such as peripherals 25 and 26. While peripherals 25 and 26 can be a variety of devices, for purposes of discussion peripherals 25 and 26 are presumed to be slave devices such as a memory device, an I/O controller, and other types of devices.

The term "interconnect" as used herein is intended to mean a device that communicates information between two or more devices. An interconnect can be implemented as a passive device or an active device. A passive device can include one or more conductive lines that transmit signals representing digital or analog information directly between devices. An active device can include a device that buffers information being transmitted, for example, an interconnect can include an active device that can store and retrieve transmitted digital information at a buffer location, such as at a first-in first-out memory or other memory device, during transmission. For purposes of discussion, interconnects 16 and 91 are implemented as busses, or data busses, and are presumed to be implemented using a plurality of conductive lines. Various information transmitted via interconnect 16 is illustrated in greater detail at FIG. 3.

Figure 3:
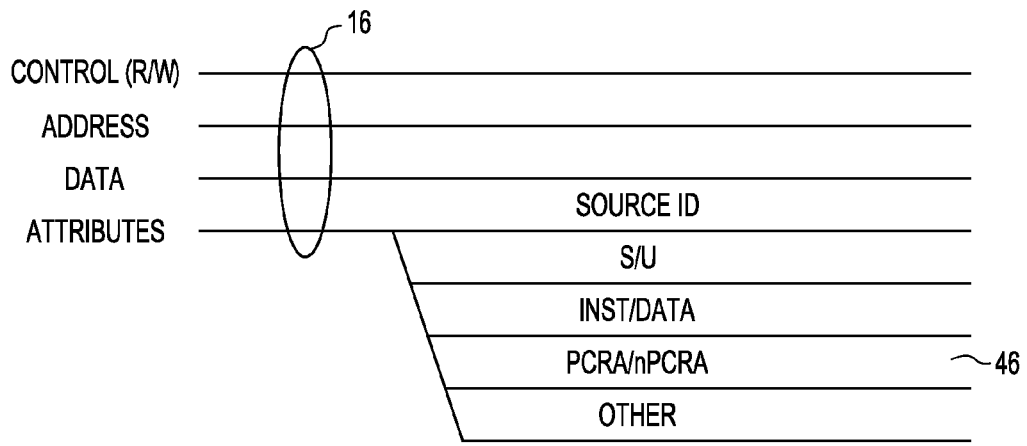
FIG. 3 illustrates a block diagram of an interconnect of the system of FIG. 2 in accordance with a particular embodiment of the disclosure.

FIG. 3 illustrates a particular embodiment of interconnect 16 that includes conductive lines labeled CONTROL, ADDRESS, DATA, and ATTRIBUTES, where each line can represent one or more conductive nodes. For convenience, the reference labels associated with the various lines can also be used herein to refer to the signal and information transmitted via those lines. For example, control data of interconnect 16 would be understood to be the information represented by control signals being transmitted via the CONTROL line.

The line labeled CONTROL transmits a read/write indicator (R/W) (not illustrated), along with other control information, such as timing/synchronization information. The line labeled ADDRESS can transmit information indicating a target address that is being accessed. The line labeled DATA can transmit information being stored at, or retrieved from, a target address. The line labeled ATTRIBUTES can provide information that indicates other specific attributes of the request. Other attribute information can be used by a destination device to control the manner in which an access request is handled. For example, attribute information can be used to validate an access request, or to control the manner in which information is to be stored or returned. The ATTRIBUTES line of FIG. 3 is illustrated to include lines labeled SOURCE_ID, S/U, INST/DATA, PCRA/nPCRA, and OTHER.

The line labeled SOURCE_ID transmits information that uniquely identifies a source of the access request being transmitted over interconnect 16. The line labeled S/U transmits information that indicates whether the access request is a supervisor access request or a user access request. The line labeled INST/DATA transmits information that indicates whether a current access request expecting an instruction to be returned, e.g. an access request generated by instruction fetch unit 43, or data to be returned, e.g., an access request generated by data operand fetch unit 44. The line labeled PCRA/nPCRA (line 46 in FIG. 2) transmits information that indicates whether or not the target address was generated using PC-relative addressing. If so, an indicator PCRA is provided, e.g., a logic one, otherwise, nPCRA is provided, e.g. a logic zero. It will be appreciated, that other types of attributes can be transmitted via interconnect 16 via the line labeled OTHER.

For purposes of discussion herein, it is presumed that all instruction and operand access requests are to the flash memory 22 via interconnect 16 (FIG. 2), though it will be appreciated that the access requests can be to other memory devices as well. Flash memory 22 is illustrated to include a flash memory array 24 and a flash controller 23 that selectively allows access requests based upon a variety of criteria, including whether an access requests is to memory space designated as XOCM or nXOCM.

Figure 4:
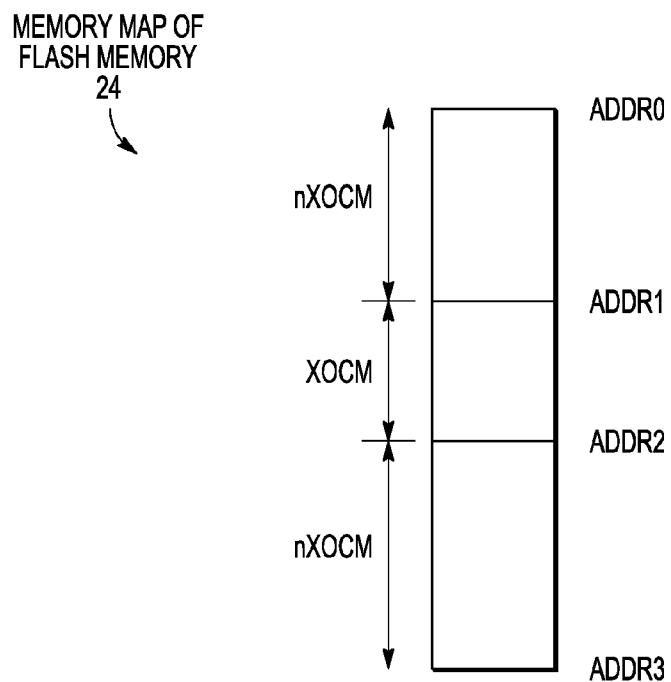
FIG. 4 illustrates a memory partitioned into various types of memory space in accordance with a specific embodiment of the disclosure.

FIG. 4 illustrates a particular embodiment of a portion of the memory map of data processor core 21 that represents the memory map of the flash memory array 24. In particular, flash memory array is illustrated to have an address range from ADDR0 to ADDR3 that includes an address space portion from ADDR1 to ADDR2 that is partitioned as XOCM, and address spaces from ADDR0 to ADDR1 and ADDR2 to ADDR3 that are partitioned as nXOCM space. The partitioning indicated at FIG. 4 can be fixed or programmable. For purposes of discussion, it is presumed that the partitioning is the result of a programmable partitioning implemented at flash controller 23.

Figure 5:
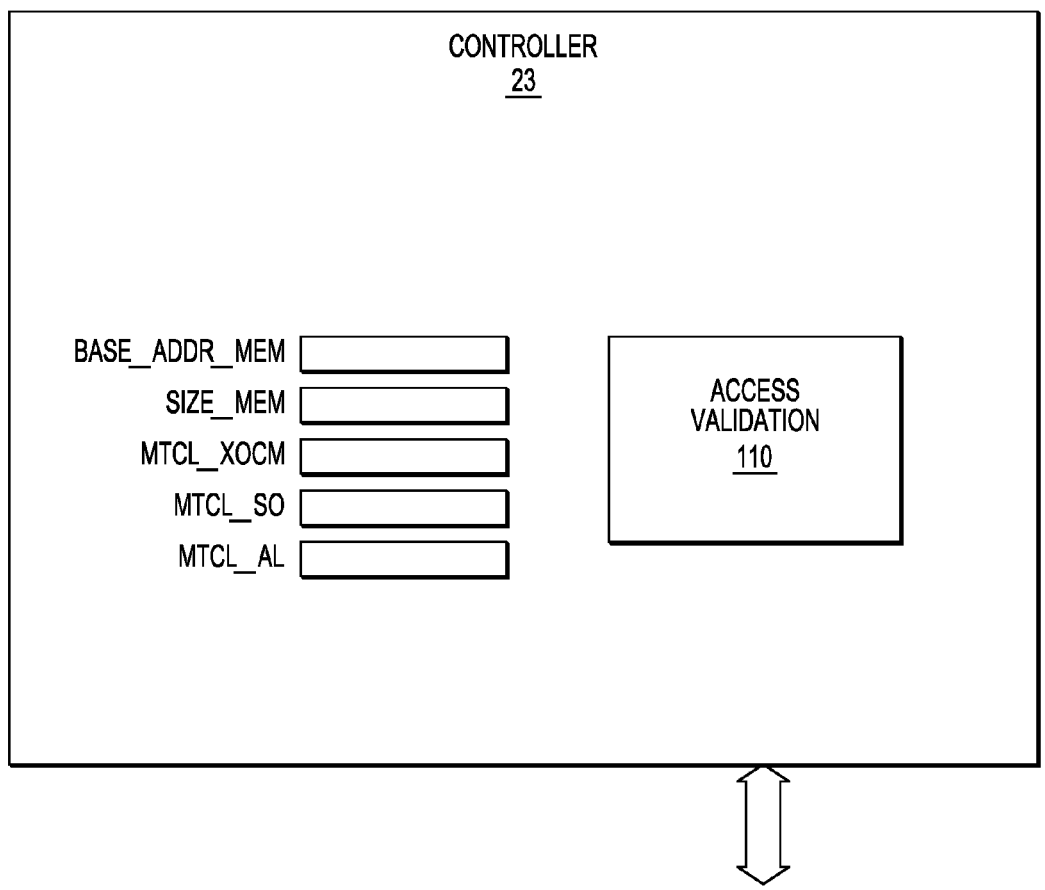
FIG. 5 illustrates a block diagram of a memory controller of a memory of FIG. 2 in accordance with a specific embodiment of the disclosure.

FIG. 5 illustrates a particular embodiment of flash controller 23 that includes an access validation module 110, and registers labeled BASE_ADDR_MEM, SIZE_MEM, MCTL_XOCM, MCTL_SO, and MCTL_AL. The register labeled BASE_ADDR_MEM stores a base address having a value referred to as "[BA]" that indicates where in memory space the flash memory array 24 resides. The register labeled SIZE_MEM indicates the size of the flash memory to be partitioned. For purposes of discussion, it is presumed that all of the flash memory array 24 array is to be partitioned by the register set illustrated at FIG. 5, though in other embodiments, a portion of the flash memory can be identified for partitioning by programming value stored at SIZE_MEM.

In accordance with a particular embodiment, the memory range of flash memory array 24 that is identified at registers BASE_ADDR_MEM and SIZE_MEM is divided into a fixed number of equal-sized regions, which by way of example is presumed to be 64 equal-sized regions. The register labeled MCTL_XOCM stores information indicating whether each particular one of the 64 equal-sized segments of flash memory array 24 is configured as XOCM or as nXOCM. The register labeled MCTL_SO stores information indicating whether each particular one of the 64 segments of flash memory array 24 is configured as a supervisor memory, which is selectively accessible by supervisor requests but not by user requests, or is configured as user memory that is accessible by both supervisor and user requests. The register labeled MCTL_AL stores information indicating whether attribute information stored at registers MCTL_XOCM and MCTL_SO that corresponds to attributes of each particular one of the 64 segments of flash memory array 24 is locked or unlocked, wherein a segment that is identified as having its attributes locked at register MCTL_AL cannot have its corresponding attribute information modified at registers MCTL_XOCM and MCTL_SO.

Figure 6:
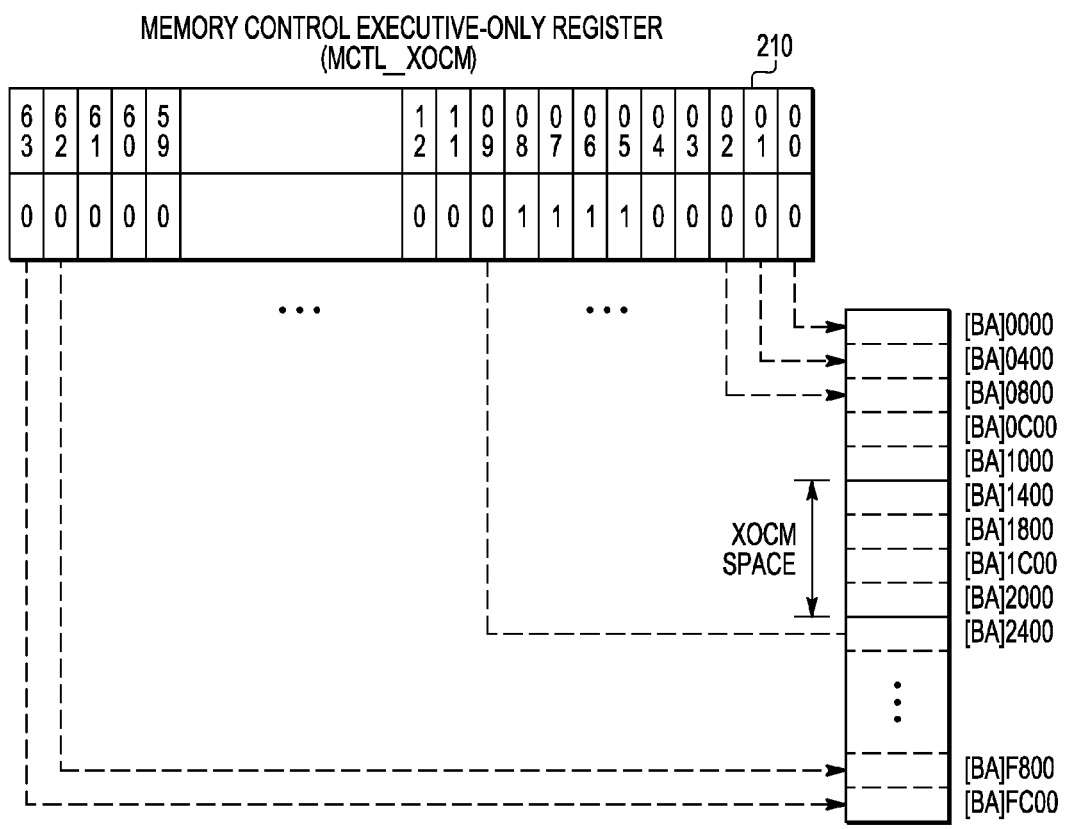
FIG. 6 illustrates a block diagram of a register of FIG. 2 used to indicate the partitioning of a particular memory space in accordance with a specific embodiment of the disclosure.

FIG. 6 illustrates a specific implementation of register MCTL_XOCM, for a 64 kB implementation of the flash memory array 24 that is on a zero-modulo-size address boundary [BA]0000. In particular, a first address of the flash memory array 24 is [BA]0000, which corresponds to ADDR0 of FIG. 4, where "0000" is a hexadecimal representation of the 16 least significant address bits and [BA] is a representation of the most-significant address bits. Thus, the flash memory array 24 at FIG. 6 is illustrated to be partitioned into 64 equal-sized segments, in this case each segment being one kilobyte in size, and having a corresponding bit at the MCTL_XOCM register 210 that indicates whether a segment is to be treated as XOCM or nXOCM. The first bit of the MCTL_XOCM register, bit MCTL_XOCM[00], corresponds to the 1 kB segment beginning at address [BA]0000, the bit MCTL[01] corresponds to the 1 kB segment beginning at address [BA]0400, and so on, until the 64th bit of the MCTL_XOCM register, MCTL[63], which corresponds to the last 1 kB segment that begins at address [BA]FC00.

By way of example, each 1 kB segment of memory array 24 is treated by the flash controller 23 as XOCM space if its corresponding bit at register MCTL_XOCM is asserted, e.g., a logic one. Similarly, each one kilobyte segment of memory array 24 is treated by the flash controller as nXOCM space if its corresponding bit in register MCTL_XOCM is negated, e.g., a logic zero. Thus, according to the specific embodiment illustrated at FIG. 6, bits MCTL_XOCM[08-05] are asserted, and all other bits of MCTL_XOCM register are negated. Thus, a 4 kB region of memory array 24 beginning at address [BA] 1400, which corresponds to ADDR1 of FIG. 4, is partitioned as XOCM space, while all other 1 kB segments of array 24 are nXOCM space.

Register MCTL_SO can be implemented in a similar manner as register MCTL_XOCM to partition the 1 kB segments of array 24 into supervisor and user memory space. MCTL_AL can also be implemented in a similar manner as register MCTL_XOCM to indicate whether the attributes of each 1 kB memory segment as indicated in register MCTL_XOCM and MCTL_AL are locked (unmodifiable) or unlocked (modifiable). For example, by setting bits MCTL_AL[08-05] to a locked indicator, presumed to be a logic one, it is not possible for the bits MCTL_XOCM[08-05] or the bits MCTL_SO[08-05] to be modified by supervisor or user access requests. This prevents the XOCM space of FIG. 6 from being changed to nXOCM space.

By way of example, operation of system 10 (FIG. 2) can be discussed with reference to specific access requests (ARs) that are represented herein using the following syntax:

AR[ReqSrc, S/U, INST/DATA, R/W{, PCRA/nPCRA}, Addr {, WData}]

wherein: this

"ReqSrc" refers to the source information at the SOURCE_ID lines of interconnect 16 that corresponds to a device that initiated the access request;

"S/U" refers to the information at the S/U line of interconnect 16, where an indicator "S" indicates that an access request is a supervisor request, and an indicator "U" indicates the access request is a user request;

"INST/DATA" refers to the information at the INST/DATA line of interconnect 16, where an indicator "INST" indicates that an access request is a instruction fetch request, and an indicator "DATA" indicates the access request is a data operand.

"R/W" refers to information at the CONTROL lines of interconnect 16, where an indicator "R" indicates that an access request is a read request, and an indicator "W" indicates the access request is a write request;

PCRA/nPCRA refers to information at the PCRA/nPCRA line 46 of interconnect 16 during an operand read request, where an indicator "PCRA" indicates that the target address of the operand request was generated using PC-relative addressing, and "nPCRA" indicates that the target address of the operand request was not generated using PC-relative addressing. Note that the use of braces, e.g., {, PCRA/nPCRA} is indicative of optional information, in this case, the data associated with an user mode operand read request;

"Addr" refers to the information at the ADDRESS lines of interconnect 16 that identifies a target address from where information is being read or written;

"WData" refers to the information at the DATA lines of interconnect 16 during a write access request that being written to the target address. Note that the use of braces, e.g., {, WData} is indicative of optional information, in this case, the data associated with a write operation.

Thus, an access request AR[DPC21, U, INST, R, M22 (Addr)] received at validation module 110 of controller 23, via at interconnect 16, includes an indicator DPC21 at the SOURCE_ID line that identifies the source of the access request as data processor core 21, an indicator U at the S/U line that identifies the access request as a user request, an indicator INST at the INST/DATA line that identifies the access request as an instruction request, an indicator R at a R/W line that identifies the access request as read request, and an indicator M22(Addr) at the ADDRESS line identifies an address (Addr) of memory 22 (M22) as the target address of the access request. The manner in which the validation module 110 handles access requests will be better understood with reference to the pseudocode of Table 1.

TABLE 1

1   if AR[S/U] == S
2   then // Supervisor Mode AR
3       {Allow Supervisor Request to proceed}

TABLE 1-continued

```
4   else // Evaluate User Mode AR further
5       if AR[Addr] is in Supervisor memory space
6       then // User Mode AR to Supervisor memory space
7           {Prevent User Access Request to Supervisor memory}
8       else // Evaluate User Mode AR to User memory space further
9           if AR[INST/DATA] == INST
10          then // User Mode Instruction AR to User memory space
11              {Allow User instruction Request to XOCM or nXOCM memory space}
12          else // Evaluate User Mode Operand AR to User memory space further
13              if AR[XOCM/nXOCM] == nXOCM
14              then // User Mode Operand AR is to User nXOCM memory space
15                  {Allow User Operand Request to User nXOCM memory space}
16              else // Evaluate User Mode Operand AR to User XOCM memory space further
17                  if (AR[PCRA/nPCRA] == PCRA
18                  then // Operand AR is result of PC relative addressing
19                      {Allow User Mode Operand Request to User XOCM memory space}
20                  else // Operand AR is not result of PC relative addressing
21                      {Prevent User Mode Operand Request to User XOCM memory space}
```

The pseudocode of Table 1 includes 21 lines. At line 1, in response to receiving an access request, validation module 110 of FIG. 5 determines whether the received access request is a supervisor request or a user request. In response to the access request being a supervisor access request, flow proceeds to line 3, via the THEN clause of line 2, where the access validation module 110 allows the access request by virtue of the access request being a supervisor request. In response to determining at line 1 that the access request is not a supervisor request, e.g., the request is a user request, flow proceeds to line 5, via the ELSE clause of line 4, for further evaluation by the validation module 110.

At line 5, it is determined whether the target address of the user request resides in supervisor or user memory space by examining the selected bit of the MCTL_SO register of controller 23 shown in FIG. 5. In response to the target address of the user request residing in supervisor memory space, flow proceeds to line 7, via the THEN clause of line 6, where the user request to supervisor memory is prevented. Otherwise, in response to the target address of the user request residing in user memory space, flow proceeds to line 9, via the ELSE clause of line 8, where the user request is further evaluated by validation module 110.

At pseudocode line 9, it is determined whether or not the user request to user memory space is an instruction request, e.g., an access request initiated by the instruction fetch unit 43. In response to the user mode access request being an instruction request, flow proceeds to line 11, via the THEN clause of line 10, wherein by virtue of being an instruction request that is not restricted from accessing either XOCM or nXOCM space, the user request to user memory space is allowed to proceed. Otherwise, in response to the user mode access request to user memory space not being an instruction request, such as an operand request generated by data fetch unit 44, flow proceeds from line 9 to line 13, via the ELSE clause at line 12, where the user operand request is further evaluated by validation module 110.

At line 13, it is determined whether the target address of the user operand request is to nXOCM space or XOCM space, for example, based upon the MCTL_XOM register of FIG. 6. In response to the operand request being to nXOCM space, flow proceeds to line 15, via the THEN clause of line 14, where the operand access request is allowed to proceed by virtue of being an operand request to nXOCM space. Otherwise, in response to the user operand request being to XOCM space, flow proceeds from line 13 to line 17, via the ELSE clause of line 16, for further evaluation by the validation module 110.

At line 17, it is determined whether the access request indicator at line PCRA/nPCRA of interconnect 16 indicates PC-relative addressing was used to generate the target address of the operand request, e.g., PCRA/nPCRA has an indicator PCRA. If so, flow proceeds to line 19, via the THEN clause of line 18, where the user operand request to access XOCM space is allowed to proceed. Otherwise, if it is determined at line 17 that the access request indicator at line is nPCRA, it is known that the target address of the operand request to XOCM space was not generated using PC-relative addressing and flow proceeds to line 21, via the ELSE clause of line 20, where the user operand request is prevented.

Thus, the access validation module 110 of flash controller 23 will allow user mode operand requests to XOCM in response to the target address of the user operand request being generated using PC-relative addressing. For example, assuming the flash memory array 24 is partitioned as indicated at FIG. 6, the validation module 110 will selectively allow the read request AR[DPC21, U, OPERAND, PCRA, R, [BA]1810] to access an operand stored at address [BA] 1810 of XOCM, as indicated at line 19 of the pseudocode of Table 1. Conversely, the validation module 110 will prevent the read request AR[DPC21, U, OPERAND, nPCRA, R, [BA]1810] to address [BA]1810, as indicated at line 21 of the pseudocode of Table 1, by virtue of the address [BA] 1810 having not been generated using PC-relative address, as indicated by the indicator nPCRA.

The implementation of XOCM by validation module 110 as described above is useful when a requesting source provides the PCRA/nPCRA indicator. However, it is often the case for integrated circuits to include a predefined module from a third-party, or from a previous project, that includes a data processor that was not originally designed to monitor and report the occurrence of PC-relative addressing. For example, such a module could have been previously used in a system that did not use XOM protection techniques. Often these modules cannot be readily modified to monitor and report the occurrence of PC-relative addressing. Therefore, an alternate embodiment of determining whether the target address of an access request was generated using PC-relative addressing would be also useful. In particular, an embodiment of determining when to access XOCM that does not require a data processor to provide information indicating when PC-relative addressing is used.

Figure 7:
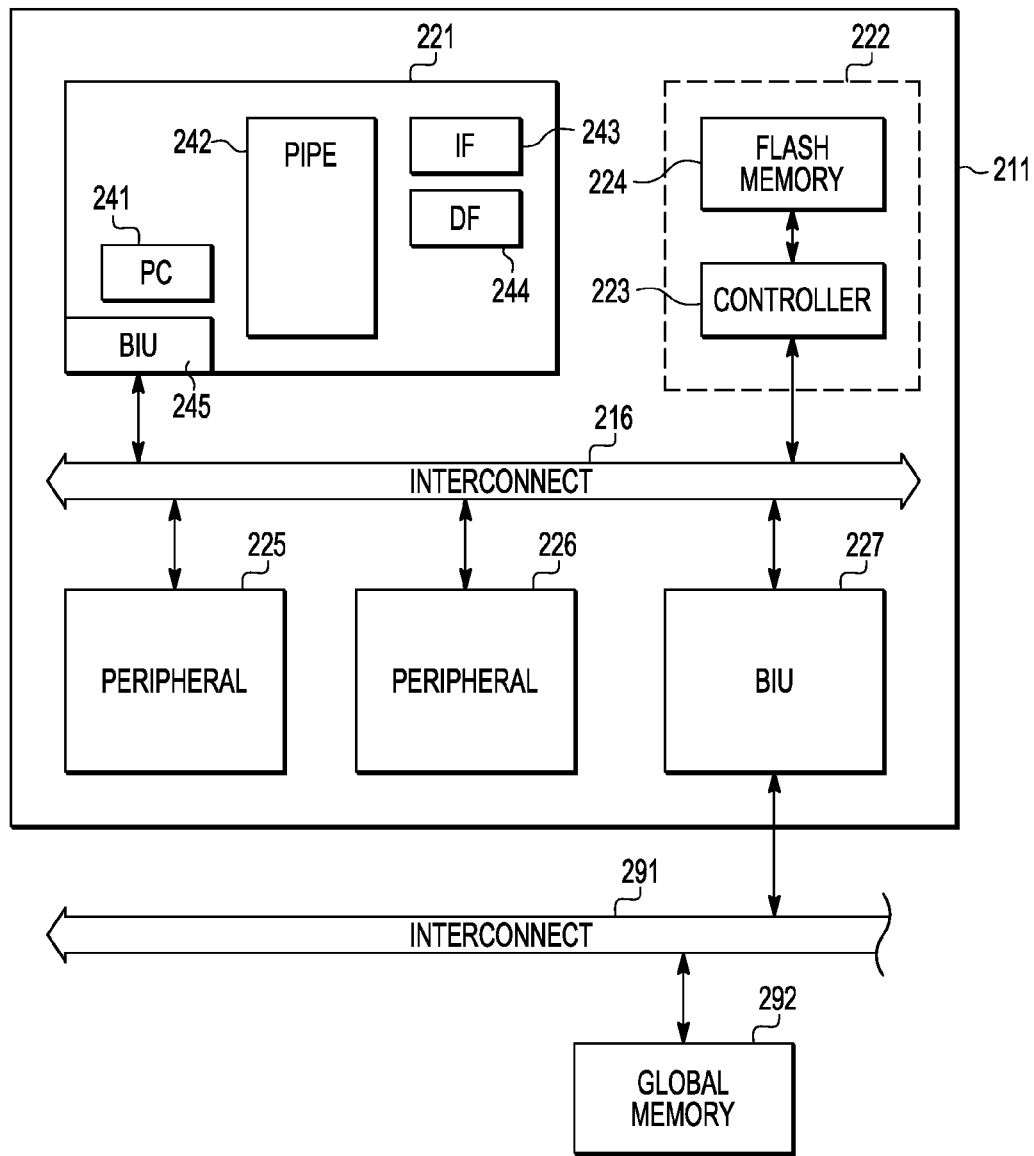
FIG. 7 illustrates an alternate embodiment of a system device in accordance with a particular embodiment of the present disclosure.
Figure 8:
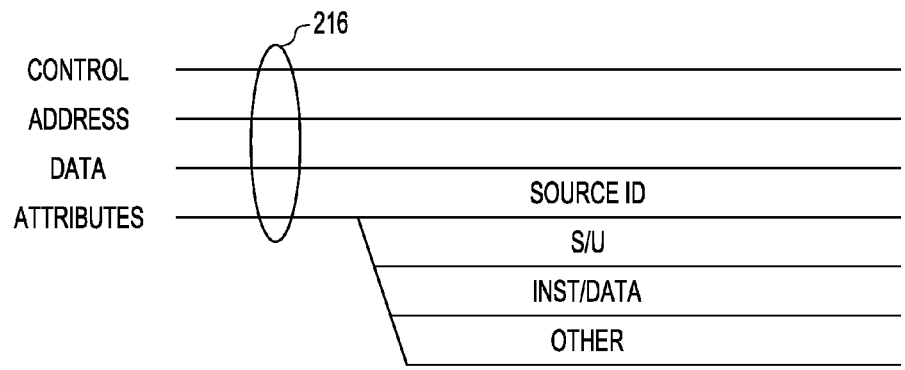
FIG. 8 illustrates a block diagram of an interconnect of the system of FIG. 7 in accordance with a particular embodiment of the disclosure.

FIG. 7 illustrates a data processing system 210 that implements a particular embodiment of selectively allowing access requests to XOCM based upon the address of a previously fetched instruction. The data processing system 210 is illustrated to include an integrated circuit 211, a global memory 292, and an interconnect 291. For purposes of description, the features illustrated at FIG. 7 perform similar operations as their similarly numbers counterparts of FIG. 2 except as described in greater detail herein.

The integrated circuit 211 includes data processor core 221 with a bus interface unit 245, a program counter register 241, a pipeline 242, a instruction fetch unit 243, and a data fetch unit 244. Data processor core 221 varies from the data processor core 21 of integrated circuit 11 (FIG. 2) in that the pipeline 242 does not provide an indication as to whether PC-relative addressing was used to generate a particular operand request. Thus, interconnect 216 of integrated circuit 211, illustrated at FIG. 8, does not include the line PCRA/nPCRA previously described embodiment of interconnect 16.

Figure 2:
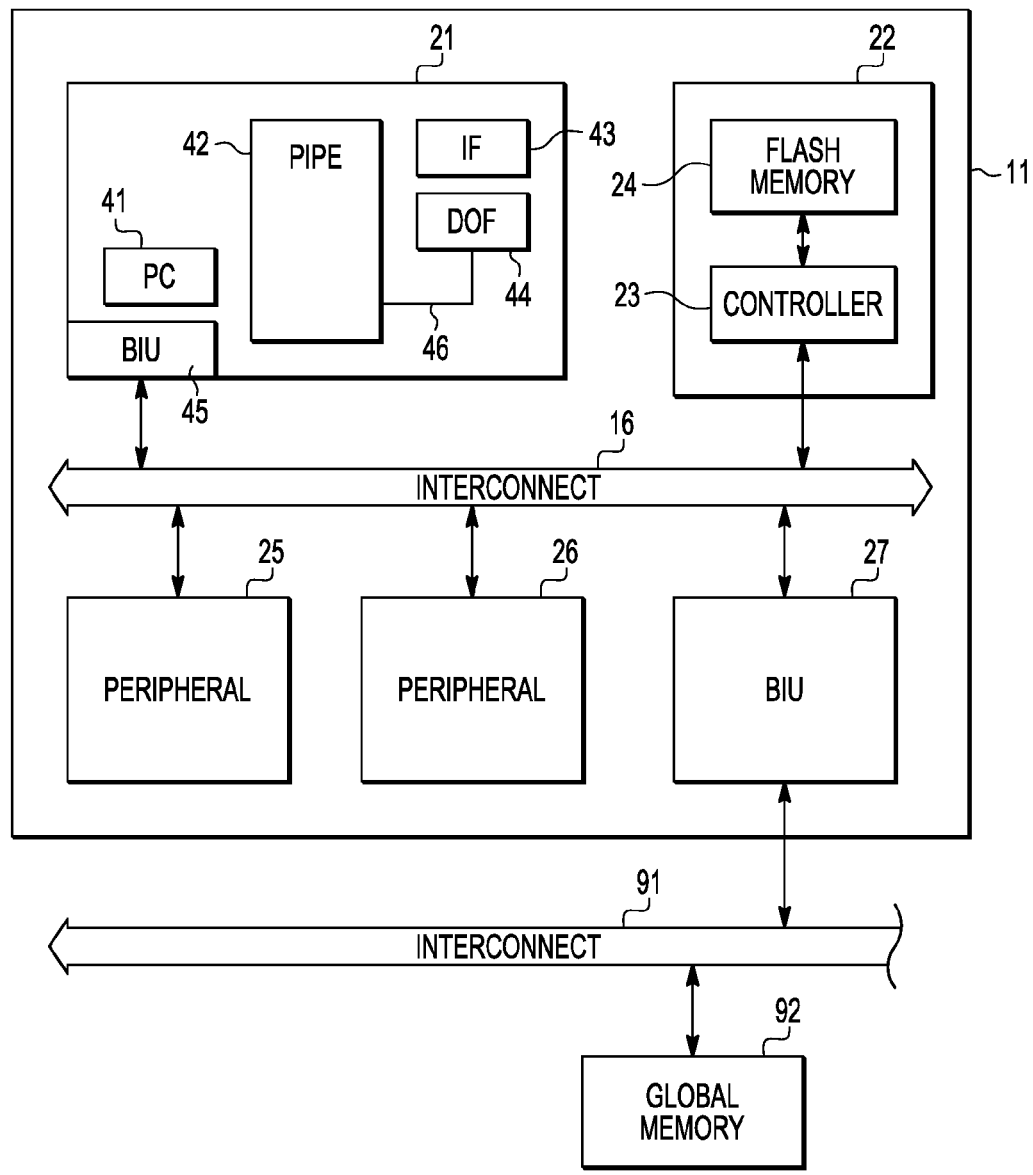
FIG. 2 illustrates a specific embodiment of a system device in accordance with a particular embodiment of the present disclosure.
Figure 9:
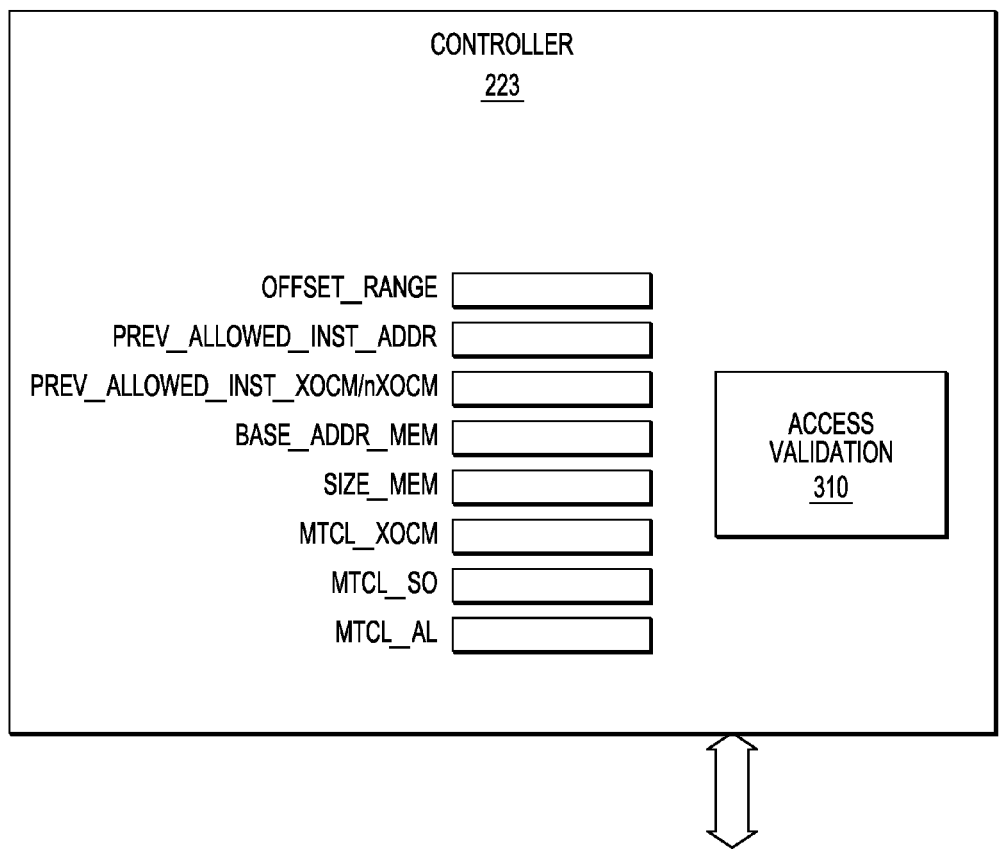
FIG. 9 illustrates a block diagram of a memory controller of a memory of FIG. 7 in accordance with a specific embodiment of the disclosure.

The flash memory 222 includes a flash controller 223, as illustrated at FIG. 9, that varies from the controller 23 of FIG. 2 in that it includes additional registers, and a validation module 310 that qualifies access requests using a different criterion than validation module 110. As compared to the validation module 110 (FIG. 5), validation module 310 includes additional registers labeled OFFSET_RANGE, PREV_ALLOWED_INST_ADDR and PREV_ALLOWED_INST_XOCM/nXOCM, where register OFFSET_RANGE stores a value that is indicative of a maximum allowed offset from a program counter when PC-relative addressing is being used. The register OFFSET_RANGE is presumed to store the maximum offset value that can be represented by an index that is added to the program counter when PC-relative addressing is used. Register PREV_ALLOWED_INST_ADDR stores the target address of an instruction that was accessed prior to a current operand access request, and register PREV_ALLOWED_INST_XOCM/nXOCM stores an indicator XOCM or nXOCM to indicate whether the previous instruction was retrieved from XOCM space or nXOCM space. Note that whether the previous instruction is currently stored in nXOCM space or XOCM space can be determined based upon the flash memory partitioning information stored at MCTL_XOCM and the target address stored at PREV_ALLOWED_INST_ADDR, or by simply examining the state of the PREV_ALLOWED_INST_XOCM/nXOCM register.

With respect to user operand requests to XOCM locations of user memory, access validation module 310 will selectively allow user operand requests based upon the target address of a previously fetched instruction, which is stored at register PREV_ALLOWED_INST_ADDR. In particular, the user operand request to XOCM is allowed to proceed based upon the target address of the operand request and the target address of the previously fetched instruction. For example, an operand access to XOCM space is allowed to proceed if it is determined that the target address of the operand request is sufficiently close to the target address of a previous instruction, stored at PREV_ALLOWED_INST_ADDR, for the target address of the operand request to have been generated using PC-relative addressing.

By way of example, operation of the access validation module 310 can be discussed with reference the pseudocode of Table 2, which is used to determine whether received access requests (ARs) are to be allowed or prevented.

TABLE 2

```
 1 if AR[S/U] == S
 2 then // Supervisor Mode AR
 3     {Allow Supervisor Request to proceed}
 4 else // Evaluate User Mode AR further
 5     if AR[Addr] is in Supervisor memory space
 6     then // User Mode AR to Supervisor memory space
 7         {Prevent User Access Request to Supervoisr memory}
 8     else // Evaluate User Mode AR to User memory space further
 9         if AR[INST/DATA] == INST
10         then // User Mode Instruction AR to User memory space
11             {Allow User instruction Request to XOCM or nXOCM memory space}
12             PREV ALLOWED INST ADDR = AR[ADDR]
13             PREV ALLOWED INST XOCM/nXOCM = AR[XOCM/nXOCM]
14         else // Evaluate User Mode Operand AR to User memory space further
15             if AR[XOCM/nXOCM] == nXOCM
16             then // User Mode Operand AR is to User nXOCM memory space
17                 {Allow User Operand Request to User nXOCM memory space}
18             else // Evaluate User Mode Operand AR to User XOCM memory space further
19                 if (AR[Addr] - LAST INST ADDR) is <= OFFSET RANGE
20                 then // Target address of User Mode Operand AR can be result of PC relative addressing
21                     if (PREV ALLOWED INST XOCM == XOCM)
22                     then // Previous instruction accessed from XOCM memory space
23                         {Allow in range User Data Operand Access Request}
24                     else // Previous instruction accessed from nXOCM memory space
25                         {Prevent in range User Mode Operand Request}
26                 else // User Mode Operand AR cannot be result of PC relative addressing of Previous Instruction
27                     {Prevent out-of-range User Mode Operand Access to XOCM memory space}
```

The pseudocode of Table 2 includes 27 lines. At line 1, in response to receiving an access request, access validation module 310 determines whether the received access request is a supervisor request or a user request. In response to the access request being a supervisor request, flow proceeds to line 3, via the THEN clause at line 2, where the access validation module 310 allows the access request to proceed by virtue of the access request being a supervisor request. In response to determining at line 1, however, that the access request is not a supervisor access request, e.g., the access request is a user request, flow proceeds to line 5 of the pseudocode, via the ELSE clause at line 4, for further evaluation by the validation module 310.

At line 5, it is determined whether or not the destination address of the user request resides in supervisor memory space by examining the selected bit of the MCTL_SO register of controller 223 (FIG. 9). If so, flow proceeds to line 7, via the THEN clause of line 6, where the user access request is prevented by virtue of being a user request to supervisor memory space. Otherwise, flow proceeds to pseudocode line 9, via the ELSE clause of line 8, in response to the target address of the user request being to user memory space, and the user request is further evaluated by validation module 310.

At pseudocode line 9, it is determined whether the user request is an instruction request. In response to the user request being an instruction request, flow proceeds to line 11, via the THEN clause of line 10, and the user request is allowed to proceed to access an instruction from either XOCM space or nXOCM space. In addition, at line 12, the target address of an allowed instruction request is stored at register PREV_ALLOWED_INST_ADDR (FIG. 9), and, at line 13, an indicator as to whether the destination address of the allowed instruction request was to XOCM or nXOCM is stored at register REV_ALLOWED_INST_XOCM/nXOCM, as described with reference to FIG. 9. The state of the XOCM/nXOCM indicator is determined by examining the selected bit from the MCTL_XOCM register of controller 223 in FIG. 9. Otherwise, in response to determining at line 9 that the user request is an operand request, flow proceeds to line 15, via the ELSE clause at line 14, and the operand request to user memory space is further evaluated by validation module 310.

At line 15, it is determined whether the target address of the operand request is to nXOCM space by examining the selected bit of the MCTL_XOCM register of controller 223 (FIG. 9) or to XOCM space. In response to the operand request being to nXOCM space, flow proceeds to line 17, via the THEN clause of line 16, and the operand access request is allowed to proceed by virtue of being an operand request to nXOCM space. Otherwise, in response to the operand request being to XOCM space, flow proceeds from line 15 to line 19, via the ELSE clause of line 18, for further evaluation by the validation module 310.

At line 19, it is determined whether the target address of the user operand request (AR[Addr]) to XOCM space is within a predefined distance (OFFSET_RANGE) of the address of a previously fetched instruction, where the address of the previously fetched instruction is stored at register PREV_ALLOWED_INST_ADDR at pseudocode line 12. In an embodiment, OFFSET_RANGE value is a programmable value that has been set to equal the maximum PC-relative offset supported by the ISA of the data processor that generated the operand request being evaluated. In other embodiments in may be set to a value less than the maximum PC-relative offset, or a fixed value. Thus, it is determined at line 19 whether the target address of the user operand request being evaluated is within the offset distance of a previously fetched instruction. If so, it is determined that the operand access request being evaluated could have been generated using PC-relative addressing by virtue of the target address of the previously fetched instruction, as evidenced by the values stored at register OFFSET_RANGE and PREV_ALLOWED_INSTR_ADDR, and flow proceeds to line 21, via the THEN clause at line 20, for further evaluation. Otherwise, if it is determined at line 19 that it is not possible for the target address of the current operand access request to have been generated using PC-relative addressing, flow proceeds to line 27, via the THEN clause of line 26, where the operand access request is prevented.

At line 21, access validation module 310 further processes the user operand request, which was determined to be proximate to the target address of a previously fetch instruction. If the target address of the previous instruction was in XOCM space, as defined by the PREV_ALLOWED_INST_XOCM/nXOCM indicator recorded as XOCM, it is determined that the target address of the current user operand request was generated using PC-relative addressing during execution of an instruction fetched from XOCM, and flow proceeds to line 23, via the THEN clause of line 22, and the operand request to XOCM is allowed to proceed. However, if it is determined at line 21 that the target address of the previous instruction was in nXOCM space, flow proceeds to line 25, via the ELSE clause of line 24, and the access request to XOCM space is prevented by virtue of the previous instruction having been fetched from nXOCM space. Thus, While it is valid for instructions to be stored in both XOCM and nXOCM space, it may be desirable to prevent an instruction fetched from nXOCM space from accessing SATA in XOCM space, even if the data is within the offset allowed by PC-relative address.

It will be appreciated that the above description is exemplary and that one or more modifications or one or more other changes can be made to any one or more of the embodiments without departing from the scope of the invention as set forth in the claims below. For example, Table 3 illustrates an alternate embodiment similar to the embodiment of Table 1, that further maintains the type of access space from which a previous instruction was fetched (line 12), and verifies at line 20 that the previously fetched instruction was fetched from XOCM space before providing the operand to the requesting source (line 22), even though it is known by virtue of the PCRA signal that the address of the operand request was generated using PC-relative addressing. Otherwise, the operand is prevented from being returned (line 24). This can provide an additional level of security over the embodiment described at FIG. 2.

TABLE 3

```
1  if AR[S/U] == S
2  then // Supervisor Mode AR
3      {Allow Supervisor Request to proceed}
4  else // Evaluate User Mode AR further
5      if AR[Addr] is in Supervisor memory space
6      then // User Mode AR to Supervisor memory space
7          {Prevent User Access Request to Supervisor memory}
8      else // Evaluate User Mode AR to User memory space further
9          if AR[INST/DATA] == INST
10         then // User Mode Instruction AR to User memory space
11             {Allow User instruction Request to XOCM or nXOCM memory space}
12             PREV_ALLOWED_INST_XOCM/nXOCM = AR[XOCM/nXOCM]
13         else // Evaluate User Mode Operand AR to User memory space further
14             if AR[XOCM/nXOCM] == nXOCM
15             then // User Mode Operand AR is to User nXOCM memory space
16                 {Allow User Operand Request to User nXOCM memory space}
17             else // Evaluate User Mode Operand AR to User XOCM memory space further
```

TABLE 3-continued

```
18          if (AR[PCRA/nPCRA] == PCRA
19          then // Operand AR is result of PC relative addressing
20              if (PREV_ALLOWED_INST_XOCM == XOCM)
21              then // Previous instruction access from XOCM memory space
22                  {Allow User Mode Operand Request to User XOCM memory space}
23              else // Previous instruction access from nXOCM memory space
24                  {Prevent User Mode Operand Request to User XOCM memory space}
25          else // Operand AR is not result of PC relative addressing
26              {Prevent User Mode Operand Request to User XOCM memory space}
```

As a further example of other possible variations, the value stored at register OFFSET_RANGE can be a programmable value that can be less than or equal to the maximum possible offset. In addition, the various methods described herein are exemplary, and not each step necessarily needs to be performed, nor does the order need to be maintained. For example, the portion of the pseudo code beginning at line 21 of Table 2 that prevents instructions stored in nXOCM space from accessing data nXOCM space need not be performed, or can be performed in a different order.

In addition, while two separate embodiments have been illustrated for determining whether to allow an operand request to XOCM, it will be appreciated that the two embodiments can reside at a common integrated circuit having multiple data processor cores. For example, an integrated circuit can include one core that provides the indicator PCRA/nPCRA and another core that does not provide the PCRA/nPCRA indicator. In such an embodiment, the validation controller would selectively implement the logic of Table 1/Table 3 or Table 2 depending upon the source indicator (SOURCE_ID) of a particular request.

In addition, multiple data processor cores can be implemented that are not capable of providing the PCRA/nPCRA indicator. Furthermore, the data processors can have different PC-relative offsets that would be selected from different OFFSET_RANGE registers (not shown) that are selected by the validation module based upon the source indicator (SOURCE_ID) of a particular request. The offsets can each be programmable, fixed, or combinations thereof.

It will be appreciated that for ease of discussion that the destination address of the immediately prior retrieved instruction, e.g., the most recently fetched instruction prior to an operand access request, is described as having been saved and compared to the destination address of a subsequent operand request. In other embodiments, however, the destination addresses of multiple previously retrieved instructions can be saved. For example, depending upon the depth of a particular pipeline, the previous instruction to which the target address of an operand request is compared may not be that of the immediately prior fetched instruction. For example, the destination address of a second or third previous instruction can be compared to the target address of the operand request.

In another embodiment, the destination addresses of some number of previously fetched instructions can be to the target address of the operand request. In another embodiment, the information related to the previously fetched instructions can be stored in response to an exception occurring to maintain the information for use upon return from exception processing. In another embodiment, the target address of the instruction that is compared to the target address of the operand request is the target address of the instruction that generated the operand request. In an alternate embodiment, the target address of the instruction that is compared to the target address of the operand request is not the target address of the instruction request. For example, if a processor's pipeline is such that a plurality of instructions may be fetched before the first one is executed, it may be necessary for the target address of an operand request to be compared to the destination address of two or more of the most recently fetched instructions.

In another embodiment, the possible offset used during PC-relative addressing mode can be larger or smaller that that described above. In addition, the possible offset can be positive or negative for some embodiments.

According to a first aspect of the disclosure, a first read request is received for a first instruction stored at a first address of memory space, and a second read request for a first operand stored at a second address of memory space are received. The second read request is selectively allowed in response to meeting at least one criteria selected from the group of criteria consisting of: the second read request being within a predefined distance of the first address, and receiving an indicator from a source of the second read request that a specific addressing mode was used to calculate the second address.

According to one embodiment of the first aspect the at least one criteria is the second read request being within the predefined distance of the first address. According to a further embodiment, the source is a first data processor and the indicator is generated by the first data processor in response to executing an instruction needing an operand a within the predefined distance of a program counter of the instruction, wherein a location of the operand relative the program counter is specified at an index field of the instruction. According to another further embodiment, the predefined distance is within a maximum PC-relative addressing offset supported by an instruction set architecture of the source. According to yet another further embodiment, the predefined distance is a fixed value. According to an alternate further embodiment, the predefined distance is a programmable value. According to yet another further embodiment, the first instruction is provided to the source in response to the first read request, and the first operand is an operand of the first instruction. According to yet another further embodiment, the first instruction is provided to the source in response to the first read request, and the first operand is not an operand of the first instruction. According to yet another further embodiment, the first instruction is the instruction most recently fetched prior to receiving the second read request. According to yet another further embodiment, the second address resides in a first type of memory space that selectively allows or prevents read requests based upon whether the read requests are operand requests, and the criteria of the second read request being within a predefined distance of the first address further includes the first address residing in the first type of memory. According to yet another further embodiment, a third read request is received for a second instruction stored at a third address of memory space, wherein the third address resides in a first type of memory space that does not selectively allow or prevent read requests based upon whether the read requests are operand requests. A fourth read request is received for a second operand stored at a fourth address of memory space, wherein the fourth address resides in a second type of memory space that does selectively allow or prevent read requests based upon whether the read requests are operand requests, and the fourth read request is selectively prevented in response to the third address, from which the second instruction was requested, being of the first type of memory space and the fourth address, from which the second operand is requested, being of the second type of memory.

According to another embodiment of the first aspect, the second read request is selectively allowed in response to receiving the indicator from the source. According to a further embodiment, the specific operand addressing mode is program counter relative addressing mode. According to another further embodiment a third read request is received for a second instruction stored at a third address of memory space, wherein the third address resides in a first type of memory space that does not selectively allow or prevent read requests based upon whether the read requests are operand requests. The fourth read request is received for a second operand stored at a fourth address of memory space, wherein the fourth address resides in a second type of memory space that does selectively allow or prevent read requests based upon whether the read requests are operand requests. The fourth read request is selectively prevented in response to the third address, from which the second instruction was requested, being of the first type of memory space and the fourth address, from which the second operand is requested, being of the second type of memory.

According to yet another embodiment of the first aspect, the first address and second address reside in a type of memory space that selectively allows operand requests based upon meeting the at least one criteria selected from the group.

According to a second aspect, a device can include a first data processor, a memory, and a validation circuit connected to the first data processor and to the memory. In response to receiving a first read request from the first data processor to access a first type of memory space, the validation circuit to determine whether the first read request is an operand request or an instruction request. In response to the first read request being an operand request, the validation circuit to selectively allow the read request in response to a target address of the operand request being within a first predefined distance of a target address of a previously allowed instruction request. And in response to the first read request being an instruction request, the validation circuit to allow the instruction request to proceed without regards to a target address of previously fetched instruction.

According to one embodiment of the second aspect a second data processor is connected to the memory, the second data processor includes an output to generate an attribute indicator for operand read requests that indicates whether or not target addresses of the operand read requests were calculated using a specific type of addressing mode. In response to receiving a second read request from the second data processor to access the first type of memory space, the validation circuit to determine whether the second read request is an operand request or an instruction request. In response to the second read request being an operand request, the validation circuit to selectively allow the read request in response to the attribute indicator indicating that a target address of the second read request was calculated using the specific type of addressing mode. And in response to the second read request being an instruction request, the validation circuit to allow the instruction request to proceed without regards to an addressing mode used to calculate the target address of the second read request. In a further embodiment, the specific type of addressing mode is PC-relative addressing mode.

According to another embodiment of the second aspect, a second data processor is connected to the memory. The validation circuit is further connected to the second data processor, and in response to receiving a second read request from the second data processor to access the first type of memory space, the validation circuit to determine whether the second read request is an operand request or an instruction request. In response to the second read request being an operand request, the validation circuit to selectively allow the second read request in response to a target address of the second read request being within a second predefined distance of a target address of a previously allowed instruction request from the second data processor, and in response to the second read request being an instruction request, the validation circuit to allow the second read request to proceed without regards to a target address of the previously allowed fetched instruction request from the second data processor. The device further includes a first programmable storage location to store the first predefined distance used by the validation circuit, and a second programmable storage location to store the second predefined distance used by validation circuit.

According to a third aspect of the disclosure, a device includes a first data processor, a memory and a validation circuit. The first data processor includes an output to generate an attribute indicator for operand read requests that indicates whether or not target addresses of the operand read requests were calculated using a specific type of addressing mode. The validation circuit is connected to the first data processor and to the memory, and in response to receiving a first read request from the first data processor to access a first type of memory space, the validation circuit is to determine whether the first read request is an operand request or an instruction request. In response to the first read request being an operand request, the validation circuit to selectively allow the first read request in response to the attribute indicator indicating that a target address of the first read request was calculated using the specific type of addressing mode. And in response to the first read request being an instruction request, the validation circuit to allow the first read to proceed without regards to an addressing mode used to calculate the target address of the first read request.

According to one embodiment of the third aspect the specific type of addressing mode is PC-relative addressing mode.

According to a fourth aspect of the disclosure a device includes a first data processor, a memory, and a validation circuit connected to the first data processor and to the memory. In response to receiving an operand read requests from the first data processor to access a first type of memory space, the validation circuit is to selectively allow an operand read request in response to at least one criteria selected from the group of criteria consisting of: the operand read request being within a first predefined address distance of a previously fetched instruction; and an indicator with the operand read request indicating that a specific addressing mode was used to calculate an address of the operand read request.

According to one embodiment of the fourth aspect, the at least one criteria is the operand read request being within the first predefined address distance of a previously fetched instruction.

According to another embodiment of the fourth aspect, the second read request is selectively allowed in response to the indicator with the operand read request indicating that the specific addressing mode was used to calculate the address of the operand read request. According to a further embodiment, the specific addressing mode is PC-relative addressing mode.

According to another embodiment of the fourth aspect, a second data processor is connected to the memory and to the validation circuit. And the validation circuit, in response to receiving an operand read request from the second data processor to access the first type of memory space is to selectively allow the operand read request from the second data processor in response to the operand read request being within a second predefined address distance of a previously fetched instruction. According to a further embodiment a first programmable storage location stores the first predefined distance used by the validation circuit, and a second programmable storage location stores the second predefined distance used by validation circuit.

In the foregoing specification, principles of the disclosure have been described with reference to specific embodiments. However, one of ordinary skill in the art appreciates that one or more modifications or one or more other changes can be made to any one or more of the embodiments without departing from the scope of the invention as set forth in the claims below.

Any one or more benefits, one or more other advantages, one or more solutions to one or more problems, or any combination thereof have been described above with regard to one or more specific embodiments. However, the benefit(s), advantage(s), solution(s) to problem(s), or any element(s) that may cause any benefit, advantage, or solution to occur or become more pronounced is not to be construed as a critical, required, or essential feature or element of any or all the claims.

Other embodiments, uses, and advantages of the present disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
   receiving a first read request for a first instruction stored at a first address of un-protected memory space, wherein accesses to unprotected memory are not selectively allow or prevent read requests based upon whether the read requests are operand requests;
   receiving, at a memory controller, a second read request for a first operand stored at a second address of protected memory space, wherein protected memory space does selectively allow or prevent read requests based upon whether the read requests are operand requests; and
   allowing, by the memory controller, the second read request in response to meeting at least one criteria selected from the group of criteria consisting of:
      comparing the first address to the second address, and determining based upon the comparison that the second read request being within a predefined distance of the first address; and
      receiving an indicator at the memory controller from a source of the second read request that a specific addressing mode was used to calculate the second address;
      otherwise preventing the second read request, by the memory controller, in response to not meeting at least one of the criteria.

2. The method of claim 1, wherein the at least one criteria is the second read request being within the predefined distance of the first address.

3. The method of claim 1, wherein the at least one criteria is the receiving an indicator, and the source is a first data processor and the indicator is generated by the first data processor in response to executing an instruction needing an operand a within the predefined distance of a program counter of the first instruction, wherein a location of the operand relative the program counter is specified at an index field of the instruction.

4. The method of claim 2, wherein the predefined distance is based upon a maximum PC-relative addressing offset supported by the first instruction.

5. The method of claim 2, wherein the predefined distance is a fixed value.

6. The method of claim 2, wherein the predefined distance is a programmable value.

7. The method of claim 2 further comprising:
   providing the first instruction to the source in response to the first read request; and
   wherein the first operand is an operand of the first instruction.

8. The method of claim 2 further comprising:
   providing the first instruction to the source in response to the first read request; and
   wherein the first operand is not an operand of the first instruction.

9. The method of claim 2, wherein the first instruction is the instruction most recently fetched prior to receiving the second read request.

10. The method of claim 1, wherein selectively allowing the second read request is in response to receiving the indicator from the source.

11. The method of claim 10, wherein the specific operand addressing mode is program counter relative addressing mode.

12. A device comprising:
   a first data processor;
   a memory; and
   a validation circuit coupled to the first data processor and to the memory,
      in response to receiving an operand read requests from the first data processor at the validation circuit to access a first type of memory space, the validation circuit to selectively allow an operand read request to the first type of memory space in response to meeting at least one criteria selected from the group of criteria consisting of:
         determining, in response to comparing an address of the operand read request to an address of a previously fetched instruction, that the operand read request is within a first predefined address distance of a previously fetched instruction; and
         an indicator with the operand read request received at the validation circuit indicating that a specific addressing mode was used to calculate an address of the operand read request;
      otherwise the validation circuit prevents the operand read request in response to at least one of the criteria not being met.

13. The device of claim 12, wherein the at least one criteria is the operand read request being within the first predefined address distance of a previously fetched instruction.

14. The device of claim 12, wherein the at least one criteria is in response to the indicator with the operand read request indicating that the specific addressing mode was used to calculate the address of the operand read request.

15. The device of claim 14, wherein the specific addressing mode is PC-relative addressing mode.

16. A device comprising:
   a first data processor, the first data processor comprising an output to generate an attribute indicator for operand read requests that indicates whether or not target addresses of the operand read requests were calculated using a specific type of addressing mode;
   a memory; and
   a validation circuit coupled to the first data processor and to the memory,
   in response to receiving at the validation circuity a first read request and the attribute indicator from the first data processor to access a first type of memory space, the validation circuit to determine whether the first read request is an operand request or an instruction request, and
   in response to the first read request being an operand request, the validation circuit to selectively allow the first read request in response to the attribute indicator indicating that a target address of the first read request was calculated using the specific type of addressing mode, and
   in response to the first read request being an instruction request, the validation circuit to allow the first read to proceed without regards to an addressing mode used to calculate the target address of the first read request.

* * * * *